(12) United States Patent
Hasegawa

(10) Patent No.: US 8,179,666 B2
(45) Date of Patent: May 15, 2012

(54) MULTILAYER ELECTROLYTIC CAPACITOR AND METHOD FOR MANUFACTURING THE SAME

(75) Inventor: Hiroaki Hasegawa, Tokyo (JP)

(73) Assignee: TDK Corporation, Tokyo (JP)

( * ) Notice: Subject to any disclaimer, the term of this patent is extended or adjusted under 35 U.S.C. 154(b) by 231 days.

(21) Appl. No.: 12/687,579

(22) Filed: Jan. 14, 2010

(65) Prior Publication Data

US 2010/0195272 A1    Aug. 5, 2010

(30) Foreign Application Priority Data

Jan. 30, 2009   (JP) .................................. 2009-019709

(51) Int. Cl.
*H01G 4/00*   (2006.01)

(52) U.S. Cl. ........ 361/540; 361/523; 361/509; 361/511; 361/512; 361/533

(58) Field of Classification Search .................. 361/540, 361/523, 509, 511, 512, 533, 502, 524
See application file for complete search history.

(56) References Cited

U.S. PATENT DOCUMENTS

| | | | |
|---|---|---|---|
| 6,307,733 B1 * | 10/2001 | Maruyama et al. | .......... 361/511 |
| 2001/0036572 A1 | 11/2001 | Kim et al. | |
| 2005/0041366 A1 | 2/2005 | Breven et al. | |
| 2006/0056136 A1 | 3/2006 | Fujii et al. | |
| 2006/0164189 A1 | 7/2006 | Tohya et al. | |

FOREIGN PATENT DOCUMENTS

| | | |
|---|---|---|
| GB | 2 405 747 A | 3/2005 |
| JP | A-6-275476 | 9/1994 |

OTHER PUBLICATIONS

Jun. 30, 2010 Search Report issued in European Patent Application No. 10150708.5.

* cited by examiner

*Primary Examiner* — Nguyen T Ha
*Assistant Examiner* — Hung Dang
(74) *Attorney, Agent, or Firm* — Oliff & Berridge, PLC

(57) ABSTRACT

A multilayer electrolytic capacitor has a laminated body in which anode foils and cathode foils are alternately laminated with separators in between, and a lead member connected to corresponding electrode foils among the anode foils and cathode foils. Each of the anode foils and each of the cathode foils have their respective main electrode portions opposed to each other through the separator and their respective lead portions led from the associated main electrode portions. Each lead portion includes an end face intersecting with a direction in which the lead portions are led, and a side face intersecting with the end face and extending in a lamination direction in the laminated body. The lead member has a first portion extending in the direction in which the lead portions are led, and a second portion intersecting with the first portion and extending in the lamination direction. The second portion of the lead member is connected to the side faces of the lead portions.

11 Claims, 12 Drawing Sheets

Fig.9
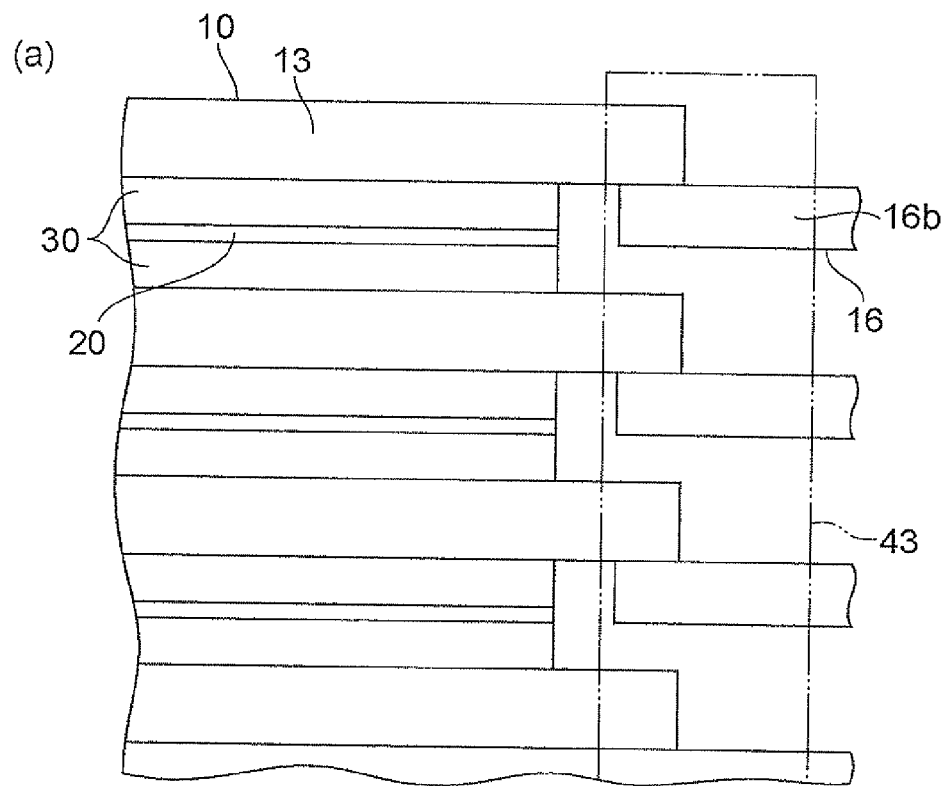
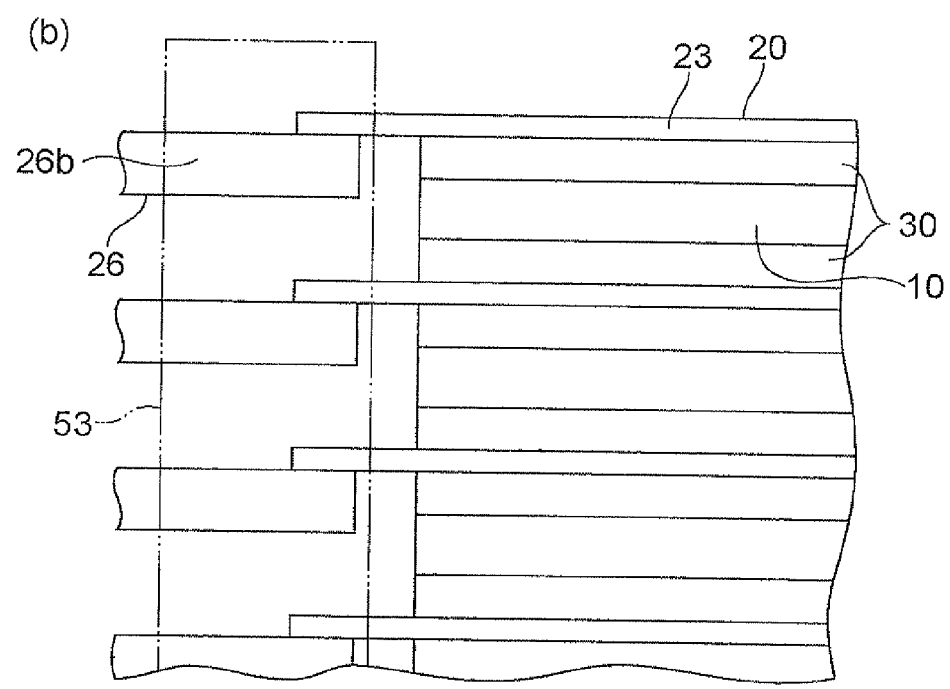

Fig12

|  | CAPACITANCE FAULT INCIDENCE | IMPEDANCE FAULT INCIDENCE |
|---|---|---|
| EXAMPLE 1 | 1% | 2% |
| EXAMPLE 2 | 1% | 4% |
| COMPARATIVE EXAMPLE 1 | 4% | 8% |

MULTILAYER ELECTROLYTIC CAPACITOR AND METHOD FOR MANUFACTURING THE SAME

BACKGROUND OF THE INVENTION

1. Field of the Invention

The present invention relates to a multilayer electrolytic capacitor and a method for manufacturing the multilayer electrolytic capacitor.

2. Related Background Art

There is a known multilayer electrolytic capacitor having a laminated body in which a plurality of anode foils and a plurality of cathode foils are alternately laminated with separators in between, and lead members connected to corresponding electrode foils among the anode foils and the cathode foils (e.g., cf. Japanese Patent Application Laid-open No. H06-275476). In the multilayer electrolytic capacitor described in Japanese Patent Application Laid-open No. H06-275476, each anode foil and each cathode foil have their respective main electrode portions opposed to each other through the separator, and their respective lead portions led from the associated main electrode portions. The lead members are connected to end faces of the corresponding lead portions by laser welding or the like.

SUMMARY OF THE INVENTION

A tensile force is sometimes exerted on the lead members in the direction in which the lead portions are led, during handling the laminated body in a manufacturing process of the multilayer electrolytic capacitor. In the multilayer electrolytic capacitor described in the foregoing Laid-open No. H06-275476, the end faces of the lead portions to which the lead members are connected, intersect with the direction in which the lead portions are led. For this reason, if the aforementioned tensile force is exerted on the lead members, the connection strength will deteriorate between the lead members and the lead portions. In this case, for example, cracks may be produced in connections between the lead members and the lead portions, so as to increase the impedance or decrease the capacitance. In the worst case, disconnection can occur between the lead members and the lead portions. In either case, the multilayer electrolytic capacitor will fail to achieve desired electric properties.

It is an object of the present invention to provide a multilayer electrolytic capacitor capable of preventing the deterioration of the connection strength between the lead members and the lead portions, and a method for manufacturing the multilayer electrolytic capacitor.

A multilayer electrolytic capacitor according to the present invention is a multilayer electrolytic capacitor comprising: a laminated body in which a plurality of anode foils and a plurality of cathode foils are alternately laminated with separators in between; and a lead member connected to corresponding electrode foils among the anode foils and the cathode foils, wherein each of the anode foils and each of the cathode foils have respective main electrode portions opposed to each other through the separator, and respective lead portions led from the associated main electrode portions, wherein each of the lead portions comprises an end face intersecting with a direction in which the lead portions are led, and a side face intersecting with the end face and extending in a lamination direction in the laminated body, wherein the lead member has a first portion extending in the direction in which the lead portions are led, and a second portion intersecting with the first portion and extending in the lamination direction in the laminated body, and wherein the second portion of the lead member is connected to the side faces of the lead portions.

In the multilayer electrolytic capacitor according to the present invention, the lead member is connected to the electrode foils in such a manner that the second portion intersecting with the first portion extending in the direction in which the lead portions are led, and extending in the lamination direction in the laminated body is connected to the side faces each intersecting with the end face intersecting with the direction in which the lead portions are led, and extending in the lamination direction in the laminated body. For this reason, even if a tensile force is exerted on the lead member in the direction in which the lead portions are led, the tensile force will be unlikely to act in the direction intersecting with the side faces, which can prevent the deterioration of the connection strength between the lead member and the lead portions.

Preferably, the lead portions are comprised of plain metal foils. Preferably, the second portion of the lead member is comprised of aluminum or nickel.

In each case, the lead portions and the lead member can be surely and readily connected.

Preferably, a resin covers connections between the side faces of the lead portions and the second portion of the lead member. In this case, an increase in leak current can be prevented.

Preferably, the anode foils and cathode foils are comprised of aluminum foils, and each anode foil includes an etched layer formed by etching the aluminum foil, and an oxide layer formed on the etched layer.

A manufacturing method of the multilayer electrolytic capacitor according to the present invention is a method for manufacturing a multilayer electrolytic capacitor, comprising: a step of alternately laminating anode foils and cathode foils each of which has a main electrode portion and a lead portion led from the main electrode portion, with the main electrode portions being opposed through separators, thereby producing a laminated body; and a step of preparing a lead member having a first portion extending in a first direction, and a second portion extending in a second direction intersecting with the first direction, and connecting the second portion of the lead member to side faces of the lead portions extending in a direction in which the lead portions are led, and in a lamination direction in the laminated body.

In the manufacturing method of the multilayer electrolytic capacitor according to the present invention, the lead member and the electrode foils are connected in such a manner that the second portion intersecting with the first portion extending in the direction in which the lead portions are led, and extending in the lamination direction in the laminated body is connected to the side faces intersecting with end faces intersecting with the direction in which the lead portions are led, and extending in the lamination direction in the laminated body. For this reason, even if a tensile force is exerted on the lead member in the direction in which the lead portions are led, the tensile force will be unlikely to act in the direction intersecting with the side faces, which can prevent the deterioration of the connection strength between the lead member and the lead portions.

Preferably, the side faces of the lead portions and the second portion of the lead member are connected by laser welding. Preferably, the lead portions are plain metal foils. Preferably, the second portion of the lead member is aluminum or nickel.

In each case, the lead portions and the lead member can be surely and readily connected.

Preferably, the manufacturing method further comprises a step of covering connections between the side faces of the lead portions and the second portion of the lead member by a resin. In this case, an increase in leak current can be prevented.

Preferably, the anode foils and cathode foils are aluminum foils, and each anode foil is an anode foil made by etching the aluminum foil to form an etched layer, and forming an oxide layer on the etched layer.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is views for explaining a sectional configuration of the laminated body.

FIG. 12 is a table showing the results of characterization tests of multilayer electrolytic capacitors.

DESCRIPTION OF THE PREFERRED EMBODIMENTS

The preferred embodiments of the present invention will be described below in detail with reference to the accompanying drawings. In the description, identical elements or elements with identical functionality will be denoted by the same reference symbols, without redundant description.

Figure 1:
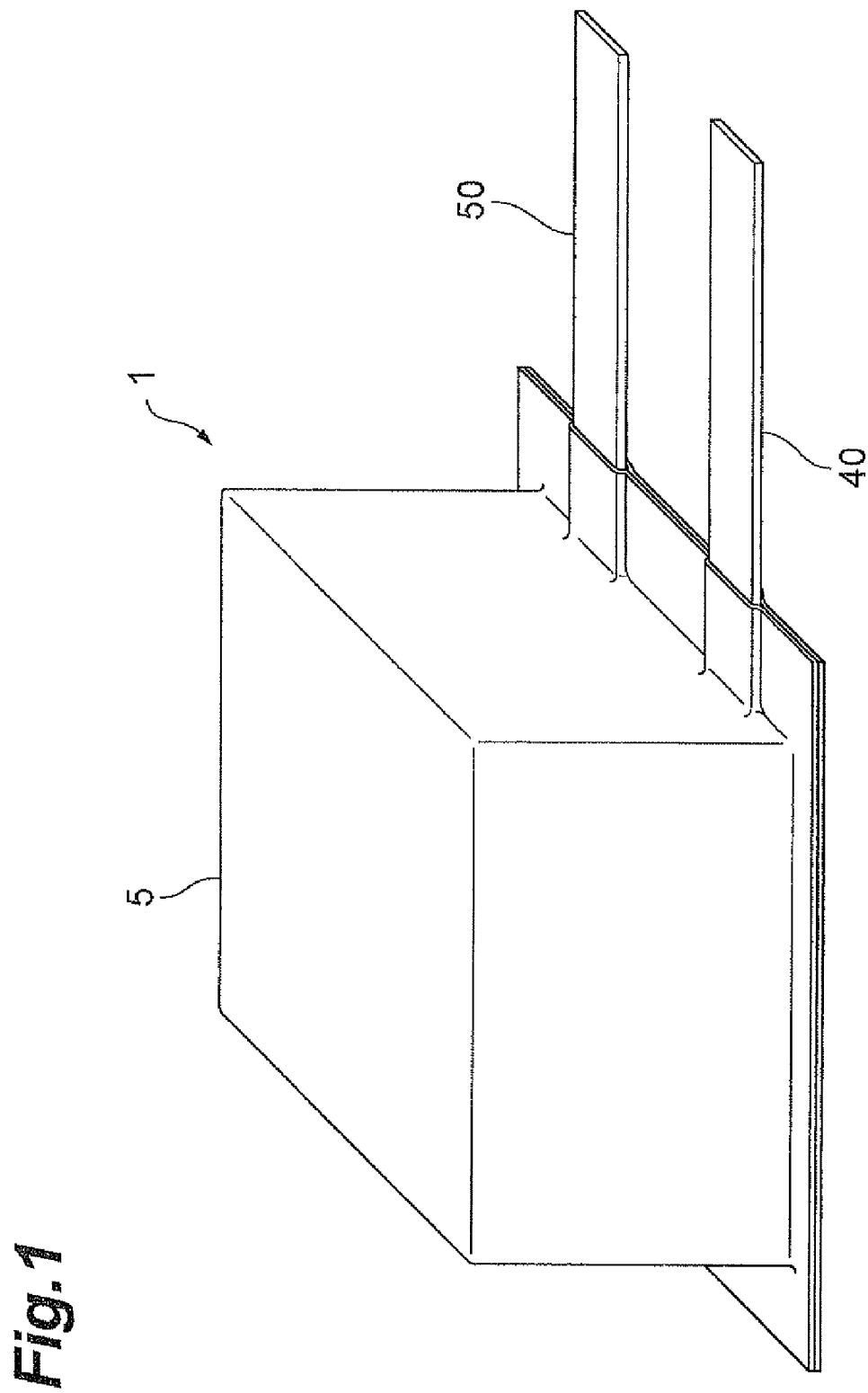
FIG. 1 is a schematic perspective view showing a multilayer electrolytic capacitor according to an embodiment of the present invention.
Figure 2:
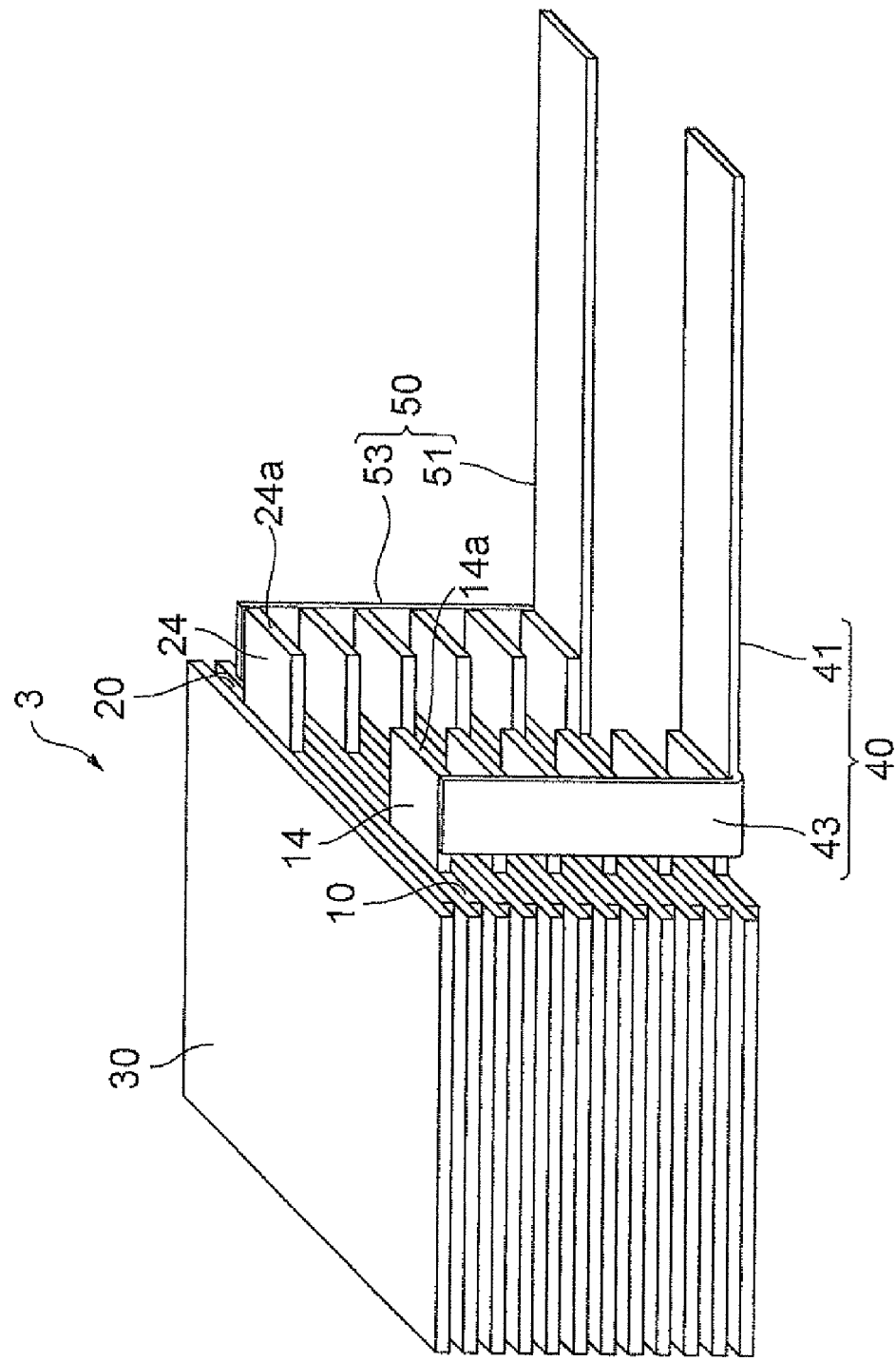
FIG. 2 is a schematic perspective view showing a laminated body.
Figure 3:
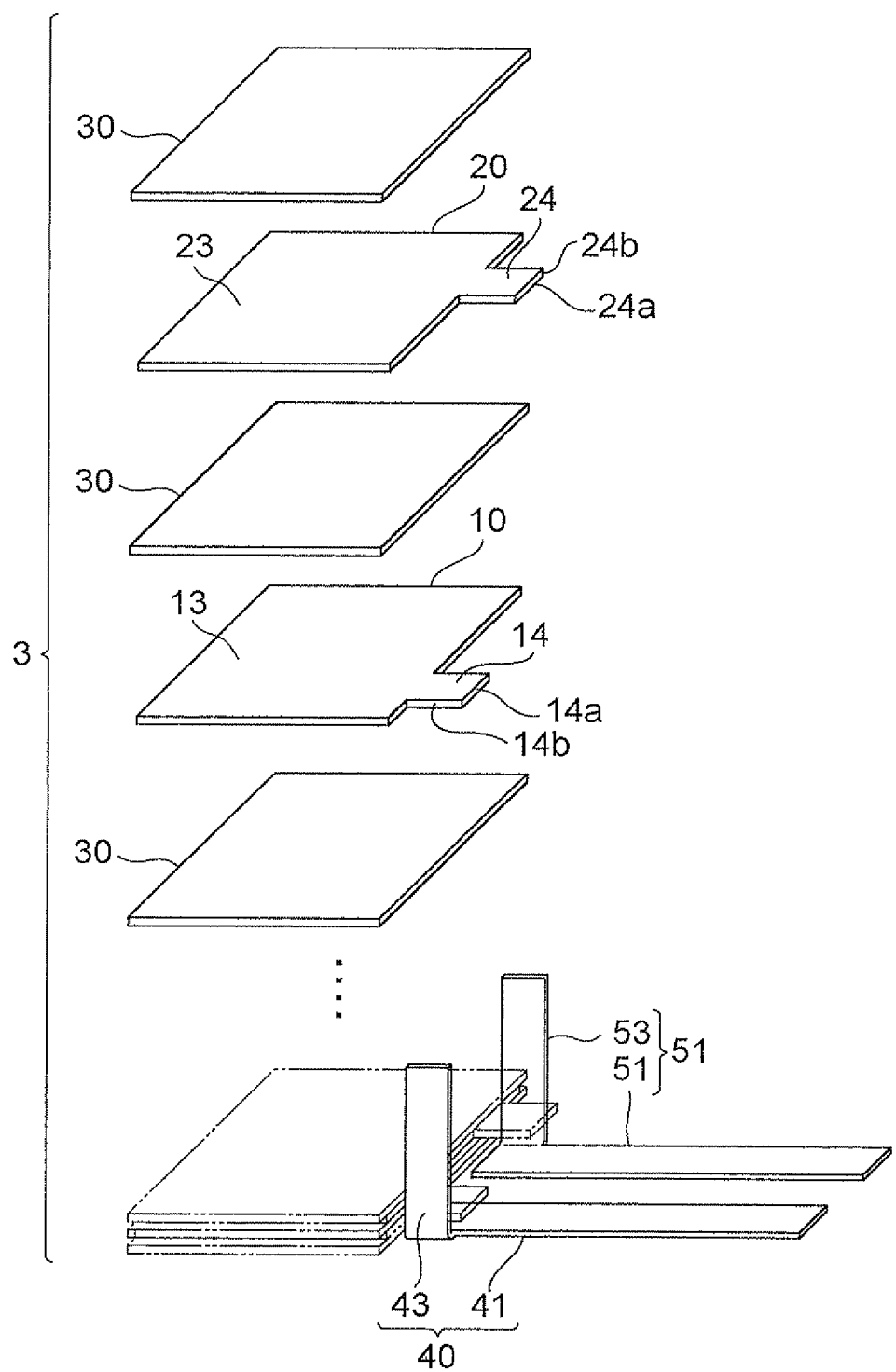
FIG. 3 is an exploded perspective view for explaining a configuration of the laminated body.
Figure 4:
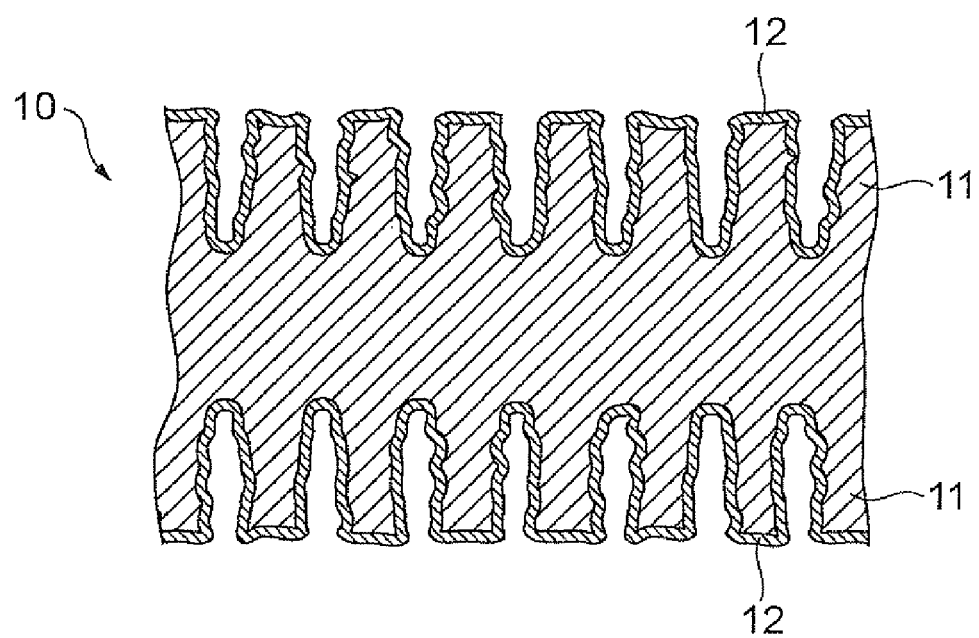
FIG. 4 is a drawing for explaining a sectional configuration of an anode foil.

A multilayer electrolytic capacitor 1 according to an embodiment of the present invention will be described with reference to FIGS. 1 to 3. FIG. 1 is a schematic perspective view showing the multilayer electrolytic capacitor according to the present embodiment. FIG. 2 is a schematic perspective view showing a laminated body. FIG. 3 is an exploded perspective view for explaining a configuration of the laminated body. FIG. 4 is a drawing for explaining a sectional configuration of an anode foil.

The multilayer electrolytic capacitor 1, as shown in FIGS. 1 and 2, has a laminated body 3, and a case 5 housing the laminated body 3. The laminated body 3, as also shown in FIG. 3, has electrode foils (anode foils 10 and cathode foils 20) and separators 30. The laminated body 3 is constructed by alternately laminating the anode foils 10 and the cathode foils 20 with the separators 30 in between.

The anode foils 10 are made of a valve metal and in foil shape. In the present embodiment, aluminum foils (e.g., 50-150 μm thick) are used as the anode foils 10. Each anode foil 10, as shown in FIG. 4, includes an etched layer 11 formed by etching, and an oxide layer 12 formed on the etched layer 11. The cathode foils 20 are comprised of etched metal foils made by forming an etched layer on plain metal foils. In the present embodiment, etched aluminum foils (e.g., 10-100 μm thick) are used as the cathode foils 20. The separators 30 are made of insulating paper, fiber nonwoven fabric, or the like and in a nearly rectangular shape. The separators 30 electrically isolate the anode foils 10 from the cathode foils 20 and function to retain an electrolytic solution (not shown).

Each anode foil 10 and each cathode foil 20 have their respective main electrode portions 13, 23 opposed to each other through the separator 30, and their respective lead portions 14, 24 led from the associated main electrode portions 13, 23. The main electrode portion 13, 23 and the lead portion 14, 24 are integrally formed.

Each main electrode portion 13, 23 is of a nearly rectangular shape. Each lead portion 14, 24 includes an end face 14a, 24a and a side face 14b, 24b. The end face 14a, 24a intersects with a direction in which the lead portion 14, 24 is led (it is approximately perpendicular to the direction in the present embodiment). The side face 14b, 24b intersects with the end face 14a, 24a (the side face is approximately perpendicular to the end face in the present embodiment) and extends in a lamination direction in the laminated body 3.

The case 5 is made of flexible film (e.g., composite packaging film). The case 5 can be produced, for example, by superimposing films of a rectangular shape and heat-sealing (thermally bonding) edges of the superimposed films. The laminated body 3 and electrolytic solution are housed in the interior of the case 5 (i.e., in a space made by a partial region of the films not heat-sealed).

The multilayer electrolytic capacitor 1, as also shown in FIGS. 1 and 2, further has a first lead member 40 and a second lead member 50. The first and second lead members 40, 50 are comprised of plain metal foils. In the present embodiment, aluminum foils are used as the first and second lead members 40, 50. The first lead member 40 is connected to each of the anode foils 10 and the second lead member 50 to each of the cathode foils 20.

Each of the first and second lead members 40, 50 has a first portion 41, 51 and a second portion 43, 53. The first portion 41, 51 extends in the direction in which the lead portion 14, 24 is led. The second portion 43, 53 intersects with the first portion 41, 51 (the second portion is approximately perpendicular to the first portion in the present embodiment) and extends in the lamination direction in the laminated body 3. The second portion 43, 53 also extends in the direction in which the lead portion 14, 24 is led.

The second portion 43 of the first lead member 40 is bonded to the lead portions 14 of the anode foils 10, for example, by laser welding in a state in which it is in contact with the side faces 14b. This makes the second portion 43 electrically and physically connected to the side faces 14b of the lead portions 14. The second portion 53 of the second lead member 50 is bonded to the lead portions 24 of the cathode foils 20, for example, by laser welding in a state in which it is in contact with the side faces 24b. This makes the second portion 53 electrically and physically connected to the side faces 24b of the lead portions 24.

Figure 5:
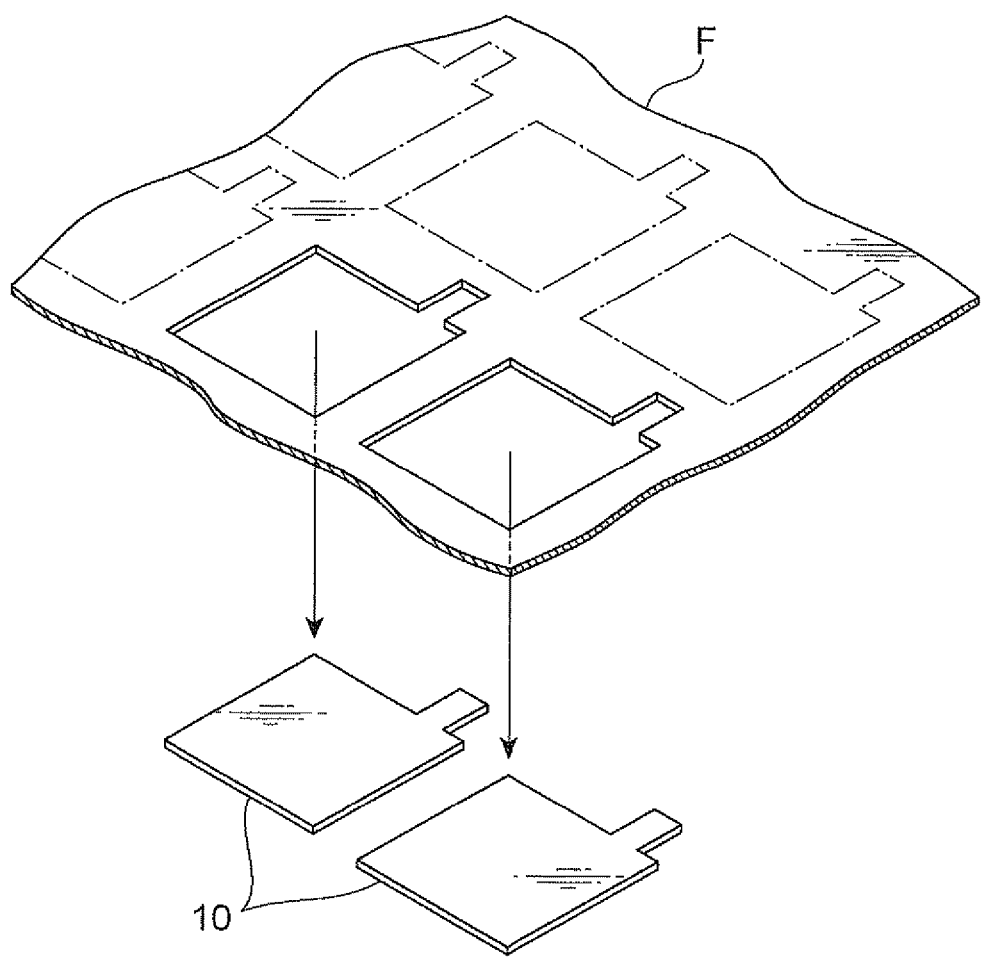
FIG. 5 is a drawing for explaining manufacturing process of the multilayer electrolytic capacitor.
Figure 6:
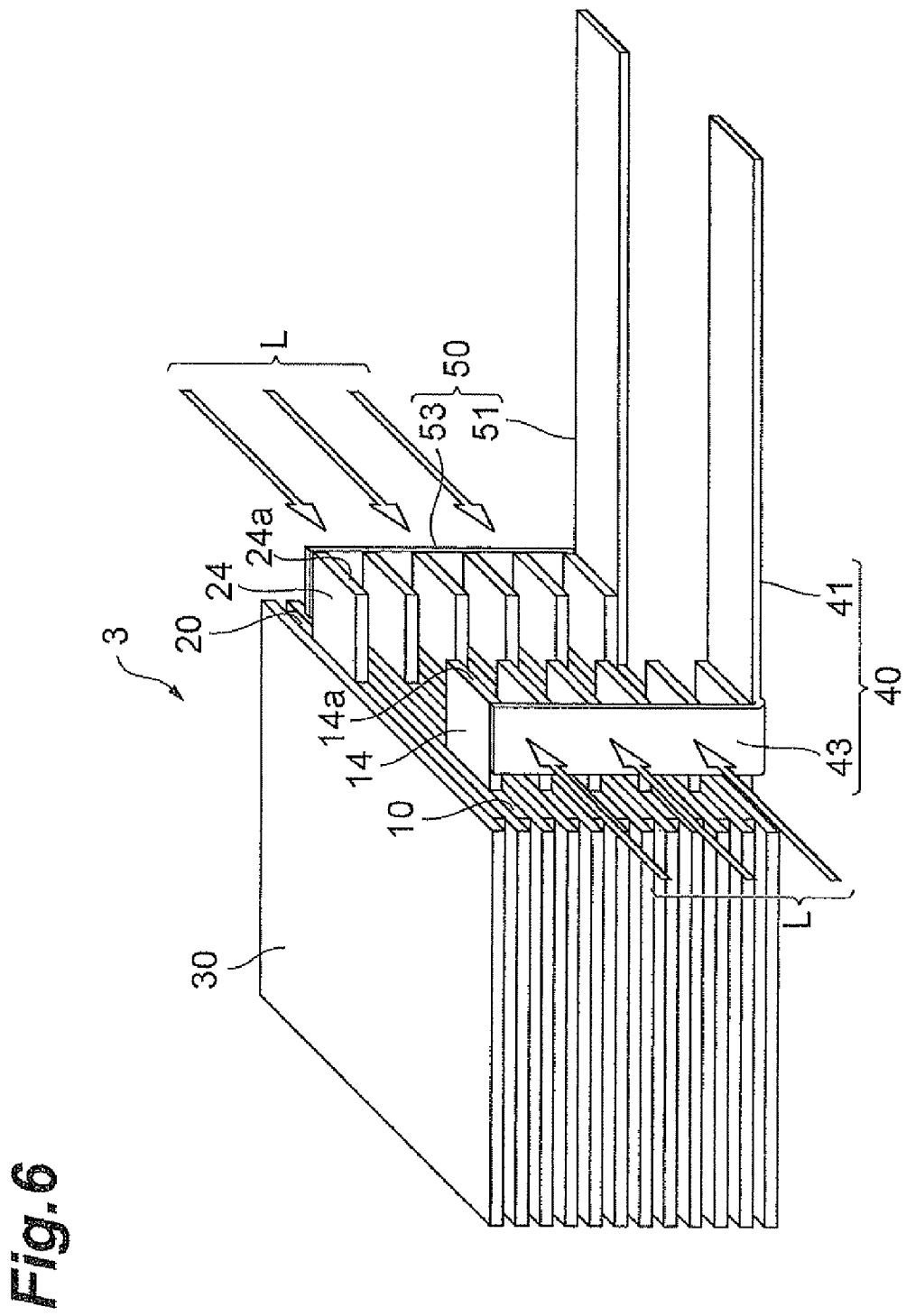
FIG. 6 is a drawing for explaining manufacturing process of the multilayer electrolytic capacitor.

A method for manufacturing the multilayer electrolytic capacitor 1 will be described below on the basis of FIGS. 5 and 6. FIGS. 5 and 6 are drawings for explaining the method for manufacturing the multilayer electrolytic capacitor.

First, an anode base sheet F for the anode foils 10 is prepared (cf. FIG. 5). The anode base sheet F consists of a large-size aluminum foil. An etched layer and oxide layer are preliminarily formed by etching and anodization (chemical conversion treatment) on both sides of the anode base sheet F. Subsequently, a plurality of anode foils 10 are formed by punching the anode base sheet F with a die.

Furthermore, a cathode base sheet is prepared for the cathode foils 20. The cathode base sheet consists of a large-size etched aluminum foil. Then a plurality of cathode foils 20 are formed by punching the cathode base sheet with a die as the anode foils 10 are.

The separators 30 are next prepared. Thereafter, the anode foils 10 and cathode foils 20 are alternately laminated so that their main electrode portions 13, 23 are opposed through the separators 30, as shown in FIG. 3. This completes the laminated body 3.

Next, the first lead member 40 is bonded to the anode foils 10 by laser welding and the second lead member 50 to the cathode foils 20 by laser welding (cf. FIG. 6). The electrode foils (anode foils 10 and cathode foils 20) and the corresponding lead members 40, 50 are bonded by YAG laser welding herein. Specifically, the second portion 43 of the first lead member 40 is brought into contact with the side faces 14b and laser irradiation L is applied from the second portion 43 side to bond the second portion 43 to the lead portions 14. The second portion 53 of the second lead member 50 is brought into contact with the side faces 24b and laser irradiation is applied from the second portion 53 side to bond the second portion 53 to the lead portions 24. The anode foils 10 are connected in parallel to the first lead member 40 and the cathode foils 20 are connected in parallel to the second lead member 50.

Next, the laminated body 3 is housed in the case 5. The case 5 is made by heat-sealing the edges (sealing part) of the aforementioned films except for an opening for insertion of the laminated body 3, in a desired seal width under a predetermined heating condition, for example, with a sealing machine. The laminated body 3 with the lead members 40, 50 connected to the electrode foils is then put into the case 5 and thereafter the electrolytic solution is poured into the case 5. At this time, the laminated body 3 may be impregnated with the electrolytic solution. Thereafter, the opening of the case 5 is sealed using a vacuum sealing machine.

Next, an aging treatment is carried out. This treatment is carried out by connecting the first lead member 40 to an anode of a dc power supply, connecting the second lead member 50 to a cathode of the dc power supply, and thereby applying a dc voltage between the anode foils 10 and the cathode foils 20. This treatment restores broken parts in the oxide layers 12 of the anode foils 10 and forms an oxide layer on cut faces made upon the punching of the anode foils 10.

The multilayer electrolytic capacitor 1 shown in FIG. 1 is obtained through these steps.

In the present embodiment, as described above, the first and second lead members 40, 50 and the electrode foils (anode foils 10 and cathode foils 20) are connected in such a manner that the second portions 43, 53 of the first and second lead members 40, 50 are connected to the side faces 14b, 24b of the lead portions 14, 24. Since the side faces 14b, 24b of the lead portions 14, 24 are the cut faces made by punching, the oxide layer 12 is not formed thereon and portions of the aluminum foils without the etched layer are exposed there. For this reason, the laser welding can be readily carried out by making use of the portions of the aluminum foils without the etched layer.

The second portions 43, 53 intersect with the first portions 41, 51 extending in the direction in which the lead portions 14, 24 are led, and extend in the lamination direction in the laminated body 3. The side faces 14b, 24b intersect with the end faces 14a, 24a intersecting with the direction in which the lead portions 14, 24 are led, and extend in the lamination direction in the laminated body 3. For this reason, even if a tensile force is exerted on the first and second lead members 40, 50 in the direction in which the lead portions 14, 24 are led, the tensile force will be unlikely to act in the direction intersecting with the side faces 14b, 24b. This results in suppressing the deterioration of the connection strength between the first and second lead members 40, 50 and the lead portions 14, 24.

In the present embodiment current paths become shorter to reduce the impedance, when compared with a configuration wherein the second portions 43, 53 of the first and second lead members 40, 50 are connected to the end faces 14a, 24a of the lead portions 14, 24.

In the present embodiment, the laser welding is applied to connect the side faces 14b, 24b of the lead portions 14, 24 to the second portions 43, 53 of the first and second lead members 40, 50. This permits the first and second lead members 40, 50 to be surely and readily connected to the lead portions 14, 24. The YAG laser welding is applied as the laser welding, but it is also possible to adopt any laser welding other than the YAG laser welding.

Figure 7:
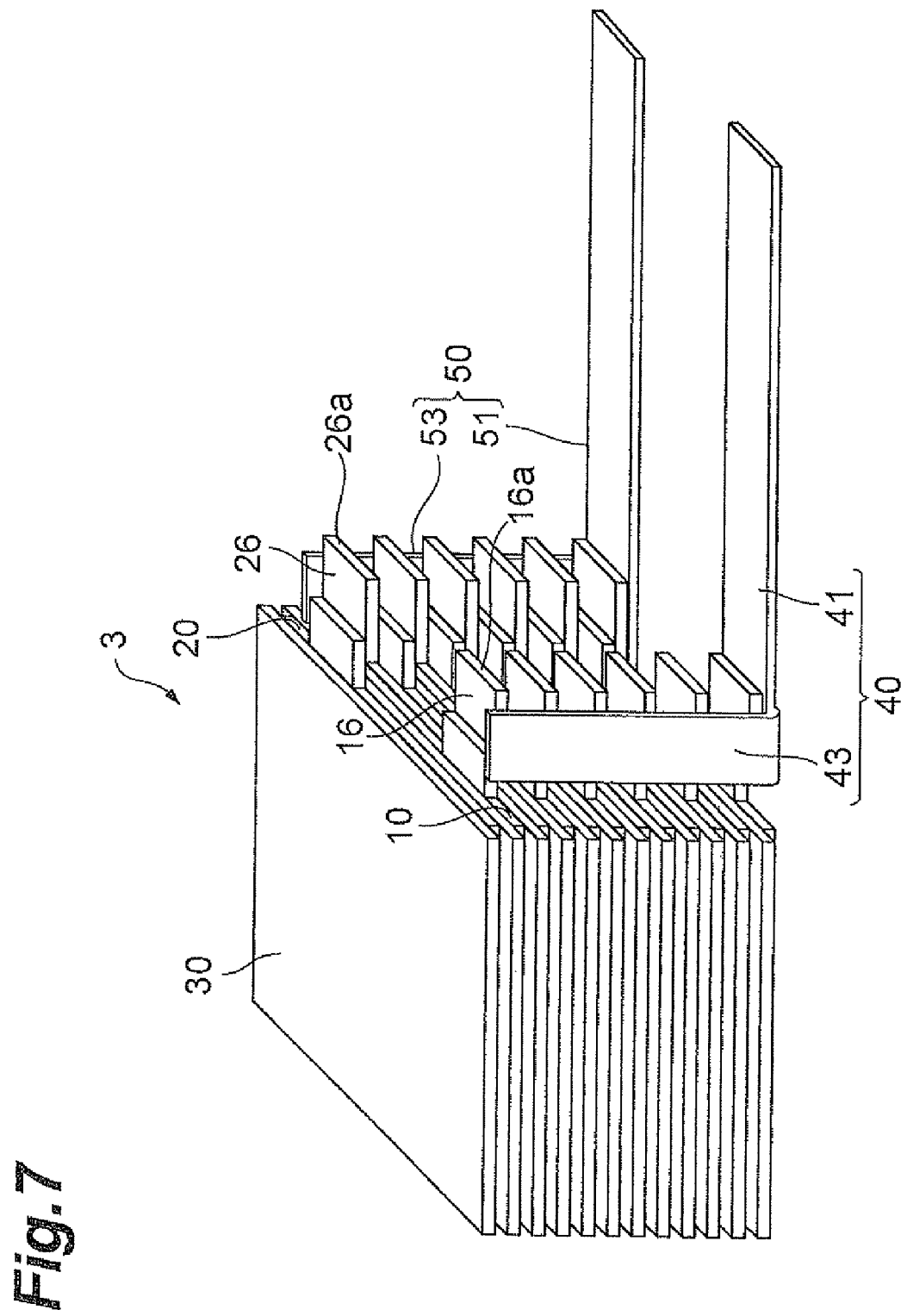
FIG. 7 is a schematic perspective view showing the laminated body of the multilayer electrolytic capacitor according to a modification example.
Figure 8:
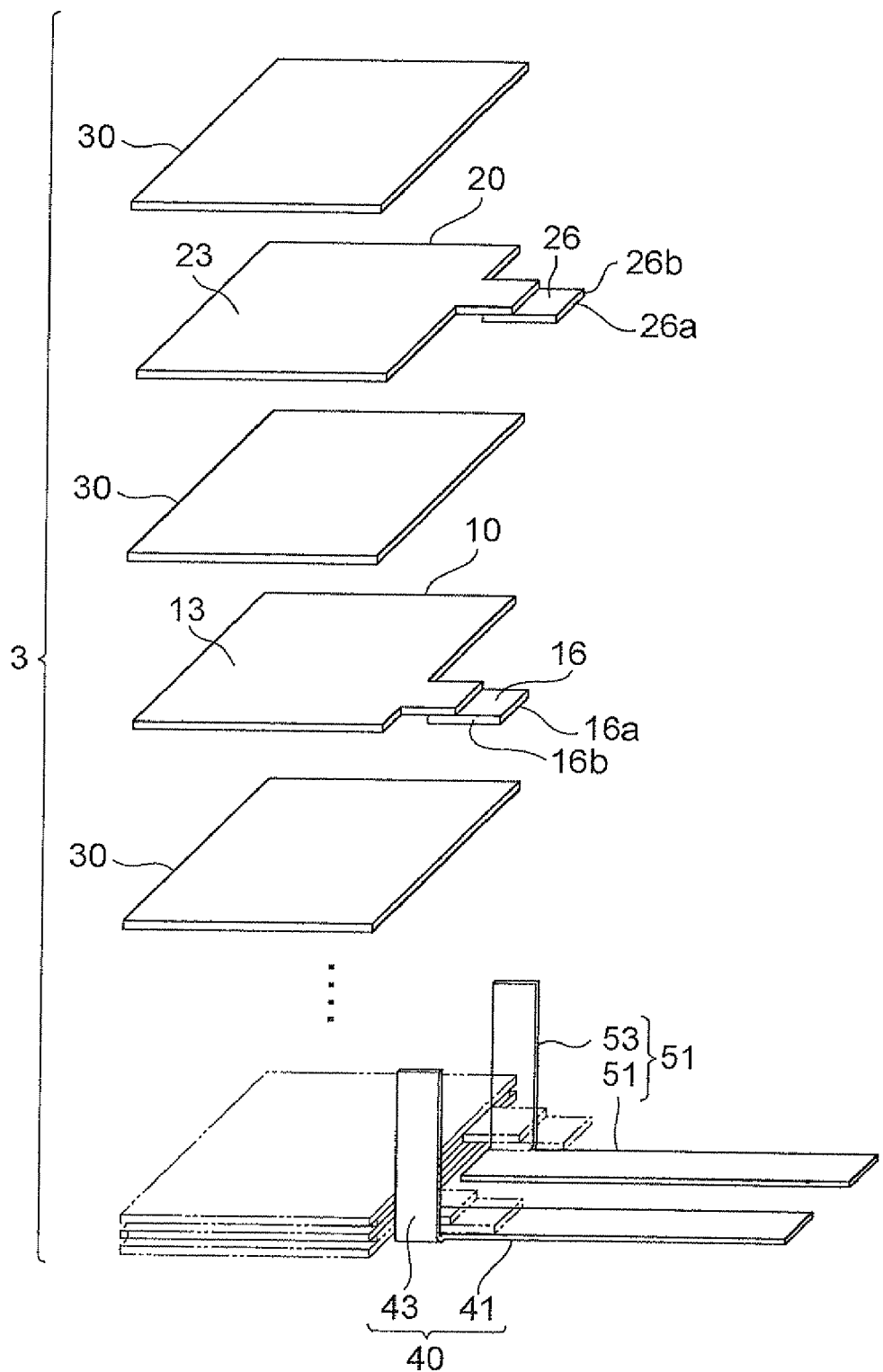
FIG. 8 is an exploded perspective view for explaining a configuration of the laminated body.

A multilayer electrolytic capacitor according to a modification example of the present embodiment will be described below. FIG. 7 is a schematic perspective view showing the laminated body of the multilayer electrolytic capacitor according to the modification example. FIG. 8 is an exploded perspective view for explaining a configuration of the laminated body. FIGS. 9 (a) and (b) are views for explaining a sectional configuration of the laminated body.

The multilayer electrolytic capacitor of the present modification example, which is not shown, has the laminated body 3, case 5, and first and second lead members 40, 50 as the multilayer electrolytic capacitor 1 does. The multilayer electrolytic capacitor of the present modification example is different in the configuration of the lead portions 14, 24 from the aforementioned multilayer electrolytic capacitor 1.

Each of the anode foils 10 and cathode foils 20, as shown in FIGS. 7 to 9, has the main electrode portion 13, 23 and lead portion 16, 26. The lead portions 16, 26 are of a nearly rectangular shape and are comprised of plain metal foils. In the present embodiment, plain aluminum foils (e.g., 50-200 μm thick) are used as the lead portions 16, 26. Each lead portion 16, 26 includes an end face 16a, 26a and a side face 16b, 26b. The end face 16a, 26a intersects with the direction in which the lead portion 16, 26 is led (the end face is approximately perpendicular to the direction in the present embodiment). The side face 16b, 26b intersects with the end face 16a, 26a (the side face is approximately perpendicular to the end face in the present embodiment) and extends in the lamination direction in the laminated body 3. The lead portion 16, 26 and the main electrode portion 13, 23 are electrically connected through mechanical connection. The mechanical connection between the lead portion 16, 26 and the main electrode portion 13, 23 can be made by swaging (e.g., stitching or the like), cold welding, ultrasonic welding, or the like.

The second portion 43 of the first lead member 40 is bonded to the lead portions 16 of the anode foils 10, for example, by laser welding in a state in which it is in contact with the side faces 16b. This makes the second portion 43 electrically and physically connected to the side faces 16b of the lead portions 16. The second portion 53 of the second lead member 50 is bonded to the lead portions 26 of the cathode foils 20, for example, by laser welding in a state in which it is in contact with the side faces 26b. This makes the second portion 53 electrically and physically connected to the side faces 26b of the lead portions 26.

In the above-described modification example, the lead portions 16, 26 consist of the plain metal foils (plain aluminum foils) and thus include no etched layer. This permits the first and second lead members 40, 50 to be surely and readily connected to the lead portions 16, 26, when compared with a configuration wherein the first and second lead members 40, 50 are connected to the lead portions including an etched layer.

Figure 10:
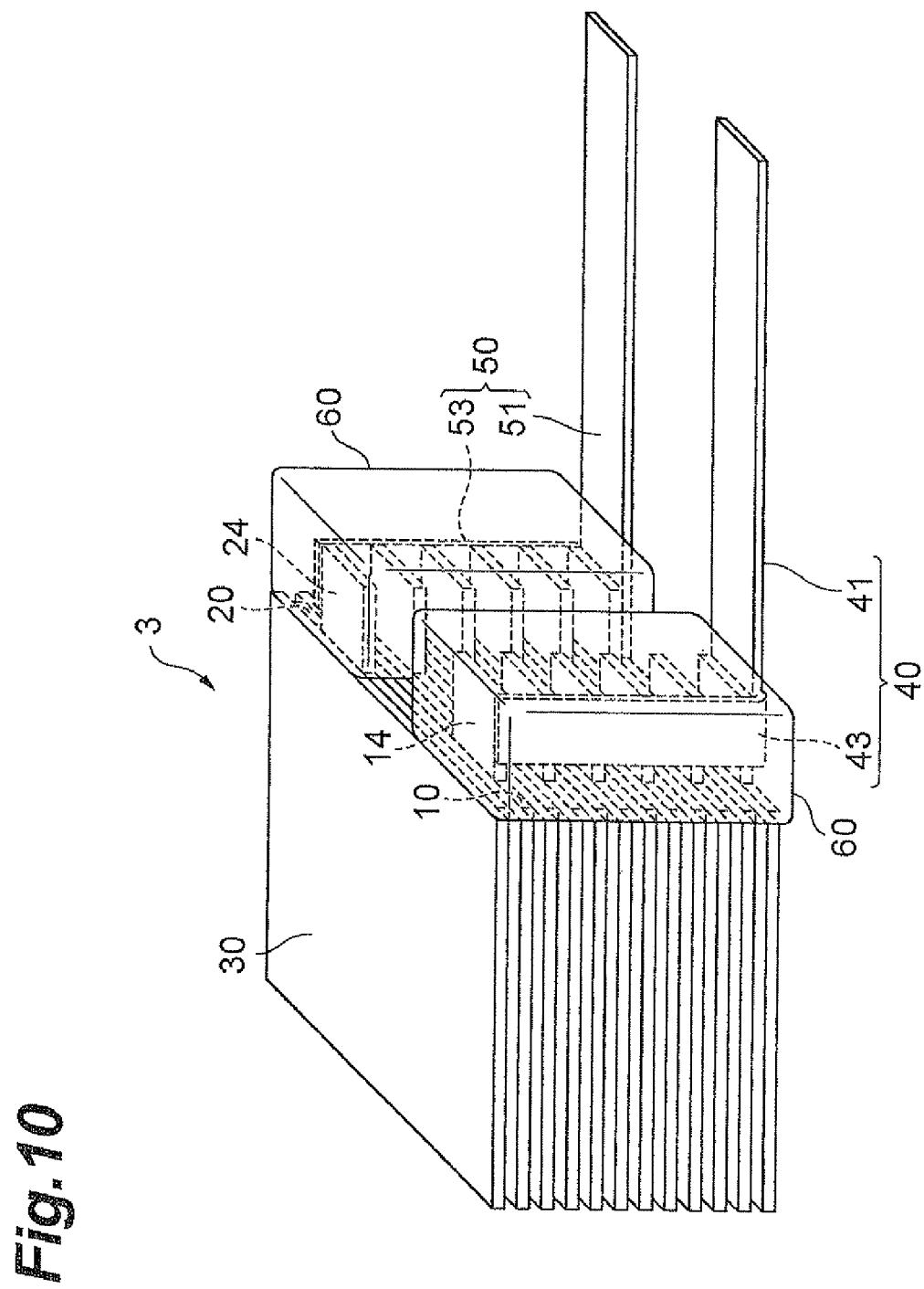
FIG. 10 is a schematic perspective view showing the laminated body of the multilayer electrolytic capacitor according to another modification example.
Figure 11:
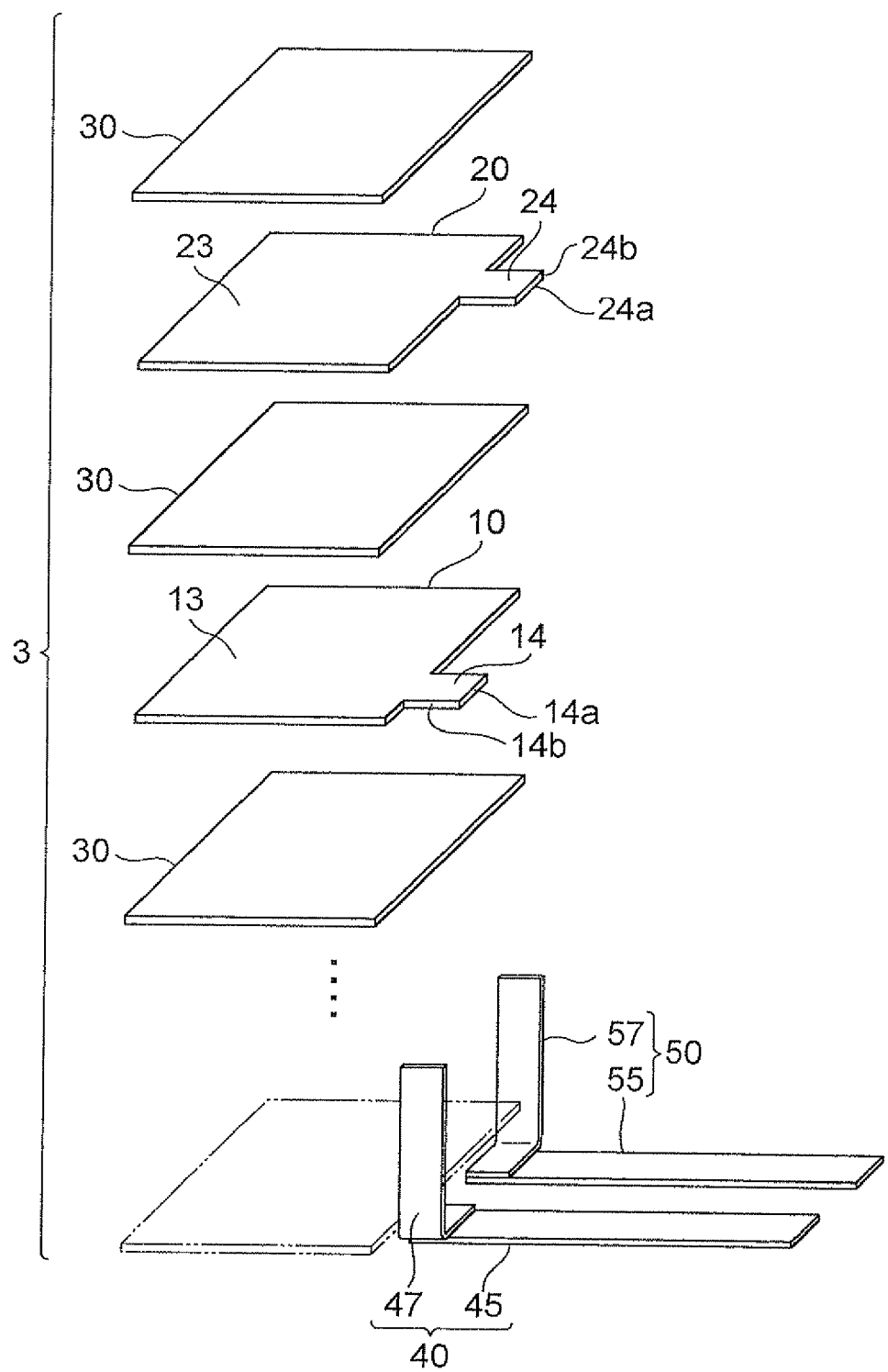
FIG. 11 is an exploded perspective view for explaining a configuration of the laminated body.

A multilayer electrolytic capacitor according to another modification example of the embodiment will be described below. FIG. 10 is a schematic perspective view showing the laminated body of the multilayer electrolytic capacitor according to the modification example. FIG. 11 is an exploded perspective view for explaining a configuration of the laminated body.

The multilayer electrolytic capacitor of the present modification example, which is not shown, has the laminated body 3, case 5, and first and second lead members 40, 50 as the multilayer electrolytic capacitor 1 does. The multilayer electrolytic capacitor of the present modification example is different in the configuration of the first and second lead members 40, 50 from the aforementioned multilayer electrolytic capacitor 1.

Each of the first and second lead members 40, 50, as shown in FIGS. 10 and 11, has a first portion 45, 55 and a second portion 47, 57. The first portion 45, 55 extends in the direction in which the lead portions 14, 24 are led, as the aforementioned first portion 41, 51 does. The second portion 47, 57 intersects with the first portion 41, 51 and extends in the lamination direction in the laminated body 3 as the foregoing second portion 43, 53 does.

The first portion 45, 55 and the second portion 47, 57 are comprised of respective plain metal foils different from each other. In the present embodiment, aluminum foils are used as the first portions 45, 55 and nickel foils are used as the second portions 47, 57. The first portion 45, 55 and the second portion 47, 57 are electrically connected through mechanical connection. The mechanical connection between the first portion 45, 55 and the second portion 47, 57 can be made by cold welding, ultrasonic welding, resistance welding, or the like.

When the second portions 47, 57 consist of the nickel foils, it is easier to perform the YAG laser welding because nickel has the reflectance for the YAG laser lower than aluminum.

Incidentally, nickel has the electric resistance lower than aluminum and is unlikely to form an oxide film through the aging treatment. In the multilayer electrolytic capacitor of the present modification example, resin 60 covers connections between the second portions 47, 57 of the first and second lead members 40, 50 and the side faces 14b, 24b of the lead portions 14, 24. This configuration prevents the leak current from increasing even in the case where nickel is used as a material of the lead members 40, 50. The resin 60 can be an epoxy resin, a silicone resin, or the like.

The above described the preferred embodiment of the present invention, but it should be noted that the present invention is by no means intended to be limited to the above embodiment and can be modified in various ways without departing from the spirit and scope of the invention.

The present invention will be described more specifically below on the basis of examples and a comparative example, but it should be noted that the present invention is not limited to the examples below.

Example 1

First, an anode base sheet with an etched layer and oxide layer was punched in the size of the main electrode portion of 17 mm×32 mm to obtain anode foils. A cathode base sheet was also punched in the size of the main electrode portion of 17 mm×32 mm in the same manner to obtain cathode foils. Thereafter, the anode foils and cathode foils were alternately laminated with separators in between to obtain a laminated body. The laminated body had five layers of the anode foils, six layers of the cathode foils, and twelve layers of the separators.

The first lead member of plain aluminum foil was prepared, the second portion of the first lead member was brought into contact with the side faces of the lead portions of the anode foils, and the YAG laser irradiation was applied from the second portion side to bond the first lead member to the anode foils. The second lead member of plain aluminum foil was prepared, the second portion of the second lead member was brought into contact with the side faces of the lead portions of the cathode foils, and the YAG laser irradiation was applied from the second portion side to bond the second lead member to the cathode foils.

Two aluminum laminate foils for a case were prepared, the laminated body was placed between the aluminum laminate foils, and thereafter three sides of the aluminum laminate foils were sealed by heat sealing. Thereafter, the electrolytic solution was poured thereinto and the remaining side of the aluminum laminate foils was sealed by heat sealing. Then the aging treatment was carried out to produce a multilayer electrolytic capacitor.

Example 2

A multilayer electrolytic capacitor was produced in the same manner as in Example 1, except that the first portions of the first and second lead members were plain aluminum foils, the second portions were plain nickel foils, and the connections between the second portions of the first and second lead members and the side faces of the lead portions were covered by epoxy resin.

Comparative Example 1

A multilayer electrolytic capacitor was produced in the same manner as in Example 1, except that the first lead member of plain aluminum foil was prepared, the second portions of the respective lead members were brought into contact with the end faces of the lead portions of the electrode foils, and the YAG laser irradiation was applied from the second portion side to bond the lead members to the electrode foils.

(Characterization Test of Multilayer Electrolytic Capacitors)

A hundred samples were prepared for each of the multilayer electrolytic capacitors in Examples 1-2 and Comparative Example 1 and the capacitance and impedance were measured for each of the hundred multilayer electrolytic capacitors in each example. A characteristic fault was defined with the capacitance less than a prescribed value or the impedance larger than a prescribed value, and a fault incidence was determined for each example. The results are shown in FIG. 12.

Examples 1 and 2 showed the incidences of capacitance faults and impedance faults lower than Comparative Example 1. If the connection strength deteriorates between the lead members and the lead portions of the electrode foils, for example, cracks may be made in the connections between the lead members and the lead portions, so as to increase the impedance or decrease the capacitance at the connections. This infers that Examples 1 and 2 succeeded in preventing the deterioration of the connection strength between the lead members and the lead portions of the electrode foils.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer electrolytic capacitor comprising:
   a laminated body in which a plurality of anode foils and a plurality of cathode foils are alternately laminated with separators in between; and
   a lead member connected to corresponding electrode foils among the anode foils and the cathode foils,
   wherein each of the anode foils and each of the cathode foils have respective main electrode portions opposed to each other through the separator, and respective lead portions led from the associated main electrode portions,
   wherein each of the lead portions comprises an end face intersecting with a direction in which the lead portions are led, and a side face intersecting with the end face and extending in a lamination direction in the laminated body,
   wherein the lead member has a first portion extending in the direction in which the lead portions are led, and a second portion intersecting with the first portion and extending in the lamination direction in the laminated body, and
   wherein the second portion of the lead member is connected to the side faces of the lead portions.

2. The multilayer electrolytic capacitor according to claim 1, wherein the lead portions are comprised of plain metal foils.

3. The multilayer electrolytic capacitor according to claim 1, wherein the second portions of the lead members are comprised of aluminum or nickel.

4. The multilayer electrolytic capacitor according to claim 1, wherein a resin covers connections between the side faces of the lead portions and the second portion of the lead member.

5. The multilayer electrolytic capacitor according to claim 1, wherein the anode foils and the cathode foils are comprised of aluminum foils, and
   wherein each anode foil comprises an etched layer formed by etching the aluminum foil, and an oxide layer formed on the etched layer.

6. A method for manufacturing a multilayer electrolytic capacitor, comprising:
   a step of alternately laminating anode foils and cathode foils each of which has a main electrode portion and a lead portion led from the main electrode portion, with the main electrode portions being opposed through separators, thereby producing a laminated body, the lead portion comprising an end face intersecting with a direction in which the lead portion is led, and a side face intersecting with the end face and extending in a lamination direction in the laminated body; and
   a step of preparing a lead member having a first portion extending in a first direction, and a second portion extending in a second direction intersecting with the first direction, and connecting the second portion of the lead member to side faces of the lead portions extending in the direction in which the lead portions are led, and in a lamination direction in the laminated body.

7. The method according to claim 6, wherein the side faces of the lead portions and the second portion of the lead member are connected by laser welding.

8. The method according to claim 6, wherein the lead portions are plain metal foils.

9. The method according to claim 6, wherein the second portion of the lead member is aluminum or nickel.

10. The method according to claim 6, further comprising a step of covering connections between the side faces of the lead portions and the second portion of the lead member by a resin.

11. The method according to claim 6,
    wherein the anode foils and the cathode foils are aluminum foils, and
    wherein each anode foil is an anode foil obtained by etching the aluminum foil to form an etched layer and forming an oxide layer on the etched layer.

* * * * *